United States Patent
Chung et al.

(10) Patent No.: US 9,696,589 B2
(45) Date of Patent: Jul. 4, 2017

(54) IN-CELL POLARIZER, LIQUID CRYSTAL DISPLAY INCLUDING THE SAME, AND METHOD OF MANUFACTURING LIQUID CRYSTAL DISPLAY

(71) Applicants: Samsung Electronics Co., Ltd., Suwon-si, Gyeonggi-do (KR); Samsung Display Co., Ltd., Yongin, Gyeonggi-Do (KR)

(72) Inventors: Jaeseung Chung, Seoul (KR); Dongouk Kim, Pyeongtaek-si (KR); Joonyong Park, Suwon-si (KR); Bongsu Shin, Seoul (KR); Daeyoung Lee, Seoul (KR); Sunghoon Lee, Seoul (KR); Gugrae Jo, Asan-si (KR); Sukgyu Hahm, Gyeongju-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 138 days.

(21) Appl. No.: 14/522,787

(22) Filed: Oct. 24, 2014

(65) Prior Publication Data
US 2015/0198833 A1    Jul. 16, 2015

(30) Foreign Application Priority Data
Jan. 13, 2014 (KR) .................. 10-2014-0004061

(51) Int. Cl.
*G02F 1/1335* (2006.01)
*G02B 5/30* (2006.01)

(52) U.S. Cl.
CPC ....... *G02F 1/13362* (2013.01); *G02B 5/3058* (2013.01); *G02F 1/133528* (2013.01);
(Continued)

(58) Field of Classification Search
CPC .......... G02F 1/13362; G02F 1/133528; G02F 1/133536; G02F 1/133605;
(Continued)

(56) References Cited

U.S. PATENT DOCUMENTS 7,414,784 B2   8/2008  Mi et al.
7,738,056 B2   6/2010  Tsujimura et al.
(Continued)

FOREIGN PATENT DOCUMENTS

EP    1180711      2/2002
JP    2010210824   9/2010
(Continued)

OTHER PUBLICATIONS

Extended Search Report issued by the European Patent Office dated Apr. 9, 2015, citing the enumerated references enclosed.

*Primary Examiner* — Paul Lee
*Assistant Examiner* — Jia Pan
(74) *Attorney, Agent, or Firm* — Cantor Colburn LLP (57) ABSTRACT

A liquid crystal display includes a light source unit, a first substrate provided on the light source unit, an electrode layer provided on the first substrate, a second substrate separate from the electrode layer, a polarizing plate provided on a surface of the second substrate, a liquid crystal layer disposed between the electrode layer and the second substrate, a reflecting unit provided on a surface of the first substrate; and a wire grid polarizer provided on an opposite surface of the first substrate.

17 Claims, 9 Drawing Sheets

(52) U.S. Cl.
CPC .. *G02F 1/133536* (2013.01); *G02F 1/133605* (2013.01); *G02F 1/133555* (2013.01); *G02F 2001/133548* (2013.01); *G02F 2001/133565* (2013.01)

(58) Field of Classification Search
CPC ........ G02F 2001/133548; G02F 2001/133565; G02F 1/133555; G02B 5/3041; G02B 5/3025; G02B 5/3058
See application file for complete search history.

(56) References Cited

U.S. PATENT DOCUMENTS

| | | |
|---|---|---|
| 7,965,357 B2 | 6/2011 | Van De Witte et al. |
| 2003/0071972 A1* | 4/2003 | Ito ..................... G02B 5/1809 353/20 |
| 2003/0072079 A1 | 4/2003 | Silverstein et al. |
| 2004/0141119 A1* | 7/2004 | Iijima ............... G02F 1/133555 349/114 |
| 2008/0094547 A1* | 4/2008 | Sugita ................ G02B 5/3058 349/96 |
| 2008/0100781 A1* | 5/2008 | Choo ................ G02F 1/133536 349/96 |
| 2008/0198302 A1 | 8/2008 | Cho |
| 2009/0170038 A1 | 7/2009 | Amako et al. |
| 2011/0222002 A1 | 9/2011 | Lee |

FOREIGN PATENT DOCUMENTS

| | | |
|---|---|---|
| KR | 1020070050237 A | 5/2007 |
| KR | 1020110101893 A | 9/2011 |
| KR | 1020120032776 A | 4/2012 |

* cited by examiner

IN-CELL POLARIZER, LIQUID CRYSTAL DISPLAY INCLUDING THE SAME, AND METHOD OF MANUFACTURING LIQUID CRYSTAL DISPLAY

CROSS REFERENCE TO RELATED APPLICATIONS

This application claims priority to Korean Patent Application No. 10-2014-0004061, filed on Jan. 13, 2014, and all the benefits accruing therefrom under 35 U.S.C. §119, the disclosure of which is incorporated herein in its entirety by reference.

BACKGROUND

1. Field

Exemplary embodiments of the invention relate to an in-cell polarizer capable of simplifying manufacturing processes, a liquid crystal display ("LCD") including the same, and a method of manufacturing an LCD.

2. Description of the Related Art

In various application fields, in order to control light emitted from a light source, a polarization characteristic of the light is used. In the case of a liquid crystal display ("LCD") using a liquid crystal ("LC") panel, for example, LC molecules change a polarization direction of linear polarization in the LC panel so that the LC panel functions as a shutter for transmitting or blocking light. The LCD includes first and second polarizing plates having polarization directions which are orthogonal to each other, and an LC layer provided between the first and second polarizing plates. Each of pixels in the LCD includes a thin film transistor ("TFT"). Whether a voltage is applied to each of the pixels is determined in accordance with a switching operation of the TFT. When the voltage is applied to the pixel, for example, the LC molecules are linearly aligned so that incident light passes through the LC layer with no change in polarization direction thereof, and is blocked by the second polarizing plate. When the voltage is not applied to the pixel, the LC molecules are twisted so that incident light passes through the LC layer due to a change in polarization direction thereof in accordance with an arrangement of the LC molecules and passes through the second polarizing plate. That is, white is displayed when LC molecules are twisted and black is displayed when the LC molecules are linearly aligned.

SUMMARY

Since use efficiency of light by polarizing plates is low, light efficiency of a liquid crystal display ("LCD") deteriorates.

Provided is an in-cell polarizer capable of simplifying manufacturing processes.

Provided is an LCD capable of simplifying manufacturing processes.

Provided is a method of manufacturing an LCD capable of simplifying manufacturing processes.

Exemplary embodiments will be set forth in part in the description which follows and, in part, will be apparent from the description, or may be learned by practice of the presented embodiments.

According to an exemplary embodiment of the invention, an LCD includes a light source unit, a first substrate provided on the light source unit, an electrode layer provided on the first substrate, a second substrate separate from the electrode layer, a polarizing plate provided on a surface of the second substrate, a liquid crystal ("LC") layer disposed between the electrode layer and the second substrate, a reflecting unit provided on a surface of the first substrate, and a wire grid polarizer provided on an opposite surface of the first substrate.

In an exemplary embodiment, the first substrate may include a first surface facing the light source unit and a second surface facing the electrode layer, the reflecting unit may be provided on the first surface of the first substrate, and the wire grid polarizer may be provided on the second surface of the first substrate.

In an exemplary embodiment, the electrode layer may include a black matrix and the reflecting unit may be arranged in a position corresponding to the black matrix.

In an exemplary embodiment, the wire grid polarizer may be arranged in a position corresponding to an opening area in which the electrode layer is exposed by the black matrix.

In an exemplary embodiment, the wire grid polarizer may be provided in an entire or partial region of the opposite surface of the first substrate.

In an exemplary embodiment, the reflecting unit may have at least one tilted side surface in a cross section.

In an exemplary embodiment, the reflecting unit may include a plurality of unit bodies.

In an exemplary embodiment, the plurality of unit bodies each may have at least one tilted side surface and the plurality of unit bodies may be arranged in a one-dimensional array structure or a two-dimensional array structure.

In an exemplary embodiment, the plurality of unit bodies each may have at least one of trapezoidal cross-sections, semicircular cross-sections, and triangular cross-sections.

In an exemplary embodiment, the reflecting unit may include a body and an uneven unit provided on the body.

In an exemplary embodiment, the body may have a rectangular cross-section or a trapezoidal cross-section.

According to another exemplary embodiment of the invention, an in-cell polarizer includes a substrate, a reflecting unit provided on a surface of the substrate, and a wire grid polarizer provided on another surface of the substrate.

A region in which the reflecting unit is provided and a region in which the wire grid polarizer is provided may partially overlap or may be separated from each other in a plan view.

According to another exemplary embodiment of the invention, a method of manufacturing an LCD includes forming a light source unit, forming a first substrate on the light source unit, forming a reflecting unit on a surface of the first substrate, forming a wire grid polarizer on an opposite surface of the first substrate in a process independent from a process of forming the reflecting unit, forming an electrode layer on the first substrate, forming a second substrate to be separate from the electrode layer, forming a polarizing plate on a surface of the second substrate, and forming an LC layer between the electrode layer and the second substrate.

In an exemplary embodiment, the wire grid polarizer may be provided by one of a nanoimprint method, a block-copolymer lithography method, an e-beam lithography method, and a glancing angle deposition method.

In an exemplary embodiment, the reflecting unit may be provided by a photolithography method.

BRIEF DESCRIPTION OF THE DRAWINGS

These and/or other exemplary embodiments will become apparent and more readily appreciated from the following description of the embodiments, taken in conjunction with the accompanying drawings, in which.

DETAILED DESCRIPTION

Exemplary embodiments of the invention now will be described more fully hereinafter with reference to the accompanying drawings, in which various embodiments are shown. Exemplary embodiments of the invention may, however, be embodied in many different forms, and should not be construed as limited to the embodiments set forth herein. Rather, these embodiments are provided so that exemplary embodiments of the invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. In the drawings, the thickness of layers and regions are exaggerated for clarity. It will also be understood that when an element is referred to as being "on" another element, it can be directly on the other element, or intervening elements may also be present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which exemplary embodiments of invention belongs. It will be further understood that terms, such as those defined in commonly used dictionaries, should be interpreted as having a meaning that is consistent with their meaning in the context of the relevant art and the exemplary embodiments of invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, an in-cell polarizer, a liquid crystal display ("LCD"), and a method of manufacturing an LCD according to an exemplary embodiment of the invention will be described in detail with reference to the accompanying drawings.

Figure 1:
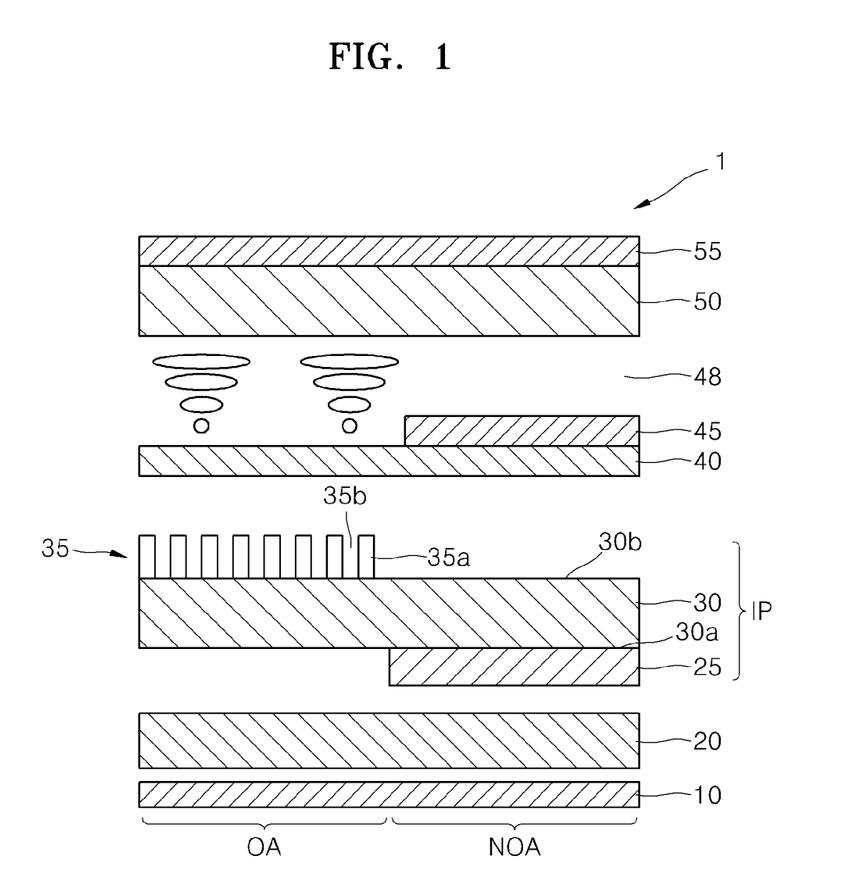
FIG. 1 schematically illustrates an exemplary embodiment of a liquid crystal display ("LCD") according to the invention.

FIG. 1 schematically illustrates an LCD 1 according to an exemplary embodiment of the invention. The LCD 1 includes a light source unit 20 and an in-cell polarizer IP for reflecting and transmitting some light emitted from the light source unit 20.

An electrode layer 40 and a second substrate 50 are separately arranged above the in-cell polarizer IP. A liquid crystal ("LC") layer 48 may be provided between the electrode layer 40 and the second substrate 50. A polarizing plate 55 may be provided on one surface of the second substrate 50.

A reflecting plate 10 may be further provided below the light source unit 20.

In an exemplary embodiment, the light source unit 20 may be classified as either a direct light type light source unit or an edge light type light source unit in accordance with an arrangement of a light source with respect to the light source unit 20. In the direct light type light source unit, the light source is provided below the in-cell polarizer IP so that light is directly irradiated on the LCD. In the edge light type light source unit, light is irradiated on the in-cell polarizer IP through a light guide plate (not shown). Both the direct light type light source unit and the edge light type light source unit may be applied to the LCD according to the exemplary embodiment of the invention. In an exemplary embodiment, a light emitting diode ("LED"), an organic light emitting diode ("OLED"), and a cool cathode fluorescent light ("CCFL") may be used as the light source of the light source unit 20. However, the light source of the light source unit 20 is not limited thereto, and various other types of light sources may be used.

The in-cell polarizer IP may include a first substrate 30, a reflecting unit 25 provided on one surface of the first substrate 30, and a wire grid polarizer 35 provided on another surface of the first substrate 30. In an exemplary embodiment, the first substrate 30 may be a transparent substrate that transmits light. In an exemplary embodiment, the first substrate 30 may be, for example, a glass substrate or a transparent plastic substrate. The reflecting unit 25 and the wire grid polarizer 35 may be provided on different surfaces of the first substrate 30. The first substrate 30 may include a first surface 30a facing the light source unit 20 and a second surface 30b facing away from the light source unit 20. In an exemplary embodiment, the reflecting unit 25 may be provided on the first surface 30a and the wire grid polarizer 35 may be provided on the second surface 30b. In another exemplary embodiment, the reflecting unit 25 may be provided on the second surface 30b and the wire grid polarizer 35 may be provided on the first surface 30a.

The reflecting unit 25 may include a material that reflects light. In an exemplary embodiment, the reflecting unit 25 may include, for example, metal. In an exemplary embodiment, the reflecting unit 25 may include at least one of aluminum (Al), silver (Ag), gold (Au), and platinum (Pt), for example. The reflecting unit 25 may be provided in a partial region of the first substrate 30. In an exemplary embodiment, the reflecting unit 25 may be provided in a region corresponding to a black matrix 45 provided on the electrode layer 40.

The LCD 1 includes a plurality of pixels, and one pixel may display one color or a plurality of colors. In an exemplary embodiment, one pixel may include three sub-pixels that display a plurality of colors, for example, red, green, and blue. In the LCD 1 of FIG. 1, one pixel or one sub pixel is illustrated. The LCD 1 may include, for example, an opening area OA that transmits light and a non-opening area NOA that does not transmit light.

The black matrix 45 may be provided on a part of the electrode layer 40 and may be arranged in accordance with an electrode pattern of the electrode layer 40. The black matrix 45 may be provided in order to prevent the electrode pattern from affecting an image. In an exemplary embodiment, a region in which the black matrix 45 is arranged may be the non-opening area NOA that does not transmit light and a remaining region may be the opening area OA that transmits light. The reflecting unit 25 may be provided in the non-opening area NOA and the wire grid polarizer 35 may be provided in the opening area OA. When the reflecting unit 25 is arranged in the non-opening area NOA, light efficiency may be improved. However, an exemplary embodiment of the invention is not limited thereto. In another exemplary embodiment, in a plan view, the reflecting unit 25 may be arranged in a region larger than the non-opening area NOA, and the wire grid polarizer 35 may be arranged in a region larger than that including the opening area OA. That is, the region in which the reflecting unit 25 is provided and the region in which the wire grid polarizer 35 is provided may not overlap or may partially overlap.

In the wire grid polarizer 35, wires 35a may be arranged on the first substrate 30 such that the wires 35a are separated from each other by a predetermined distance. In an exemplary embodiment, an arrangement period of the wires 35a may be smaller than a wavelength of incident light. Grooves 35b may be defined between adjacent wires 35a. A pitch between the wires 35a may be no more than a quarter of the wavelength of the incident light. In an exemplary embodiment, the pitch between wires may be larger than 0 and no more than about 200 nanometers (nm). A fill factor of the wire grid polarizer 35 may be no less than about 0.3 and smaller than about 1. The fill factor represents a cross-sectional area ratio between the wire 35a and the groove 35b. A height of the wire 35a taken along a vertical direction in a cross section may be no less than about 100 nm, and, for example, an aspect ratio of the wire 35a may be no less than about 1.

In an exemplary embodiment, the wire 35a may include metal, for example, at least one of Al, Ag, Au, copper (Cu), nickel (Ni), and Pt.

In an exemplary embodiment, the wire grid polarizer 35 may transmit only light of first polarization of the incident light and may reflect light of second polarization of the incident light, for example. The first polarization may be P polarization and the second polarization may be S polarization.

In an exemplary embodiment, since the reflecting unit 25 and the wire grid polarizer 35 are provided on different surfaces of the first substrate 30, the reflecting unit 25 and the wire grid polarizer 35 may be manufactured by independent processes. As described above, the manufacturing processes of the reflecting unit 25 and the wire grid polarizer 35 may be separately performed to simplify manufacturing processes of the in-cell polarizer IP. When the reflecting unit 25 is manufactured in the same surface of the substrate as that of the wire grid polarizer 35, after the wire grid polarizer 35 is manufactured, since a process for protecting the wire grid polarizer 35 must be additionally performed while manufacturing the reflecting unit 25, the manufacturing processes of the in-cell polarizer may be very complicated. In addition, a position or the manufacturing processes of the reflecting unit 25 may vary in accordance with a pattern of the black matrix 45. Manufacturing processes of the wire grid polarizer 35 may become complicated in accordance with changes in the manufacturing processes of the reflecting unit 25. Since the reflecting unit 25 and the wire grid polarizer 35 may be arranged on different surfaces of the substrate to independently manufacture the reflecting unit 25 and the wire grid polarizer 35, the manufacturing processes of the in-cell polarizer may be simplified.

The electrode layer 40 may be provided above the in-cell polarizer IP. In an exemplary embodiment, the electrode layer 40 may include a pixel electrode for driving the LC layer 48 and a thin film transistor ("TFT") for applying voltage to the pixel electrode, for example.

In an exemplary embodiment, the second substrate 50 may be a transparent substrate that transmits light and may be used as an electrode layer. In an exemplary embodiment, the second substrate 50 may include a transparent oxide semiconductor material. In an exemplary embodiment, the second substrate 50 may include a transparent conductive material such as indium tin oxide ("ITO"), indium zinc oxide ("IZO"), ZnO, and $In_2O_3$.

The polarizing plate 55 may be provided on one surface of the second substrate 50. In an exemplary embodiment, the polarizing plate 55 may be provided on an upper or lower surface of the second substrate 50. In an exemplary embodiment, the polarizing plate 55 may be an absorbing type polarizing plate or a reflecting type polarizing plate, for example. When the polarizing plate 55 is the reflecting type polarizing plate, the polarizing plate 55 may be, for example, a wire grid polarizing plate.

Next, operation of the LCD1 will be described.

Light is emitted from the light source unit 20 and is incident on the in-cell polarizer IP. Of the light incident on the in-cell polarizer IP, light incident on the reflecting unit 25 may be reflected to the light source unit 20 and light incident on a region excluding the reflecting unit 25 may pass through the first substrate 30 and then be reflected or transmitted by the wire grid polarizer 35 in a polarization direction. In an exemplary embodiment, the light of the P polarization may be transmitted and the light of the S polarization may be reflected.

The light reflected by the reflecting unit 25 and the light reflected by the wire grid polarizer 35 may be reflected by the light source unit 20 or a reflecting plate 10 back to the in-cell polarizer IP so as to be re-incident on the in-cell polarizer IP. The re-incident light is recycled by repeating the above processes so that light efficiency may be improved. In the case where the reflecting unit 25 is arranged on the first surface 30a of the first substrate 30, a recycling rate of light is higher than when the reflecting unit 25 is reflected to the second surface 30b of the first substrate 30. When the reflecting unit 25 is arranged to be closer to the light source unit 20, the recycling rate of the light may be higher.

The light that passes through the in-cell polarizer IP is incident on the LC layer 48. A voltage is applied between the electrode layer 40 and the second substrate 50, and transmittance of the light may be controlled in accordance with the magnitude of the applied voltage. Grayscales may be displayed by controlling the transmittance of the light. In an exemplary embodiment, the polarizing plate 55 may have a polarization direction that is perpendicular to the polarization direction of the wire grid polarizer 35. In an exemplary embodiment, the polarizing plate 55 may transmit, for example, the light of the S polarization.

As described above, each pixel may control transmittance of light to display an image. A color filter may be provided to display a color image.

Figure 2:
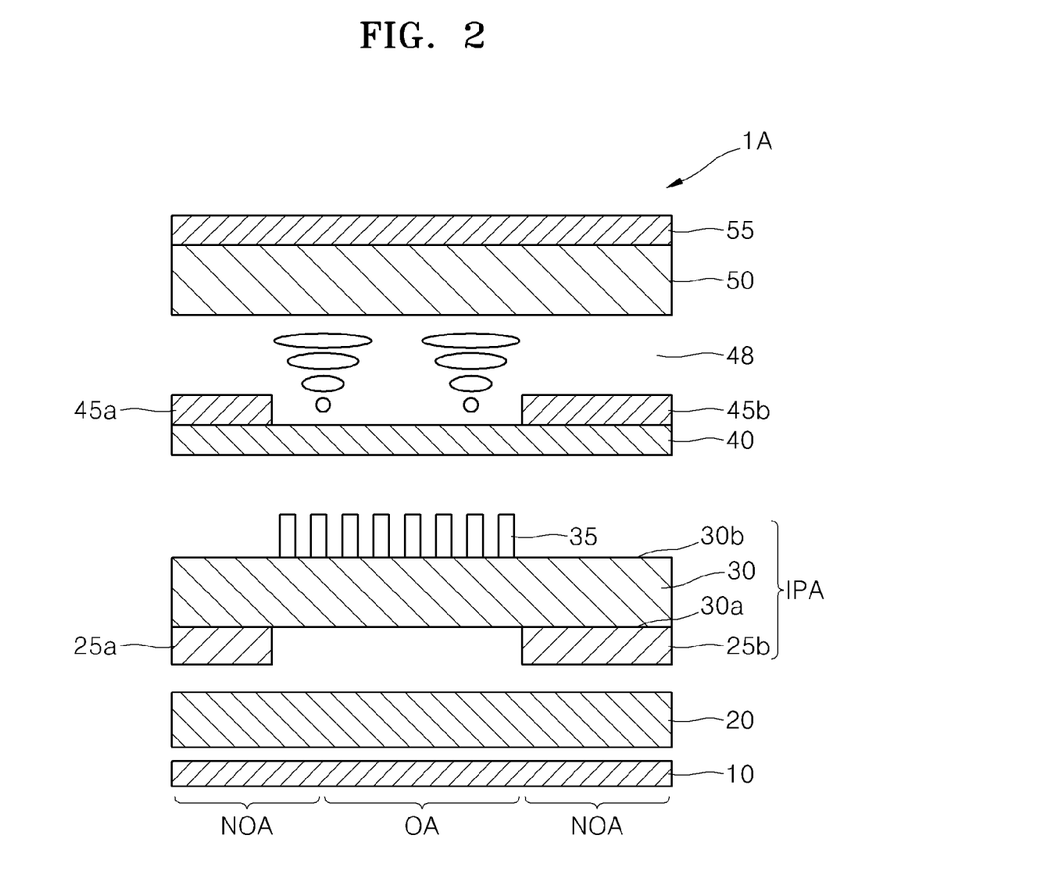
FIG. 2 illustrates a modification of the LCD of FIG. 1.

Next, FIG. 2 illustrates a modification of the LCD of FIG. 1.

As illustrated in FIG. 2, an LCD 1A includes an in-cell polarizer IPA. The in-cell polarizer IPA includes a first substrate 30, a reflecting unit provided on one surface of the first substrate 30, and a wire grid polarizer 35 provided on another surface of the first substrate 30. The reflecting unit may include a first reflecting unit 25a provided in one region of a first surface 30a of the first substrate 30 and a second reflecting unit 25b provided in another region of the first surface 30a of the first substrate 30. The wire grid polarizer 35 may be provided in an opening-area OA between the first reflecting unit 25a and the second reflecting unit 25b. The first reflecting unit 25a and the second reflecting unit 25b may be provided in a non-opening area NOA corresponding to a region in which a first black matrix 45a and a second black matrix 45b are provided on an electrode layer 40.

In FIG. 2, since elements denoted by the same reference numerals as those of FIG. 1 actually have the same structures and perform the same operations as those of FIG. 1, repeated description thereof will not be given. In FIG. 2, an example is illustrated in which the first and second reflecting units 25a and 25b are provided and correspond to the non-opening area NOA in which the first and second black matrices 45a and 45b are provided.

Figure 3:
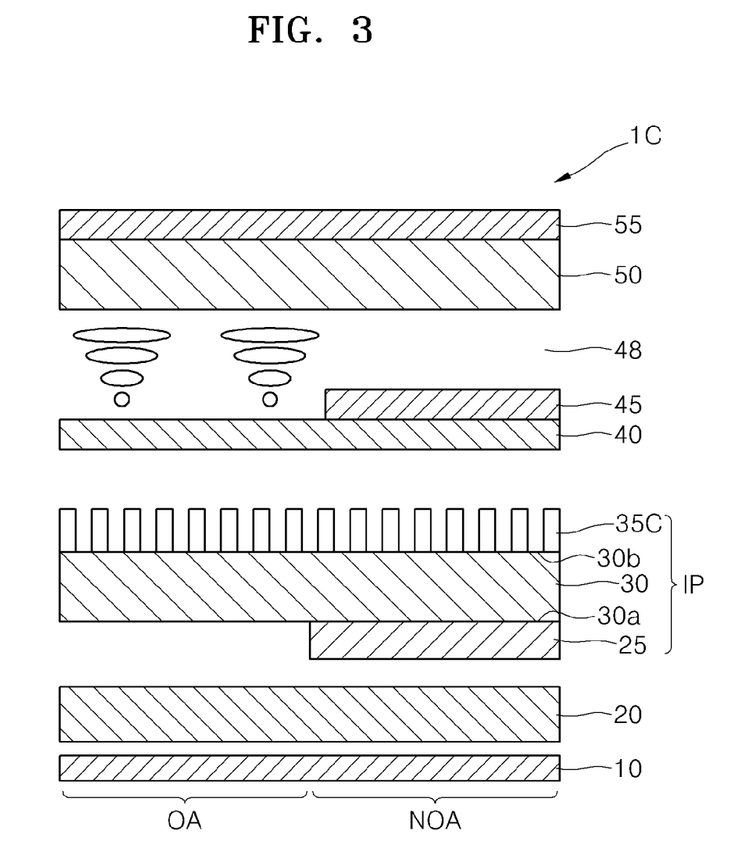
FIG. 3 illustrates another modification of the LCD of FIG. 1.

FIG. 3 illustrates another modification of the LCD of FIG. 1. As illustrated in FIG. 3, an LCD 1C includes an in-cell polarizer IP. The in-cell polarizer IP may include a first substrate 30, a reflecting unit 25 provided on one surface of the first substrate 30, and a wire grid polarizer 35C provided on another surface of the first substrate 30. The reflecting unit 25 may be provided in a non-opening area NOA where a black matrix 45 is provided. The wire grid polarizer 35C may be provided on an entire second surface 30b of the first substrate 30. The wire grid polarizer 35C is provided on the entire second surface 30b so that manufacturing processes may be simplified in comparison with a case in which the wire grid polarizer 35C is provided in a partial region of the second surface 30b. This is because, when the wire grid polarizer 35C is provided in the partial region, a process of etching another partial region in which the wire grid polarizer 35C is not required is added. However, the etching process is not required for the structure illustrated in FIG. 3.

Next, various examples of the in-cell polarizer IP will be described.

Figure 4:
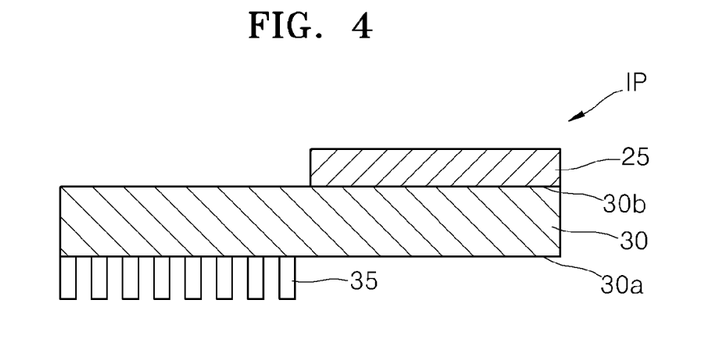
FIGS. 4 to 6 illustrate examples of an exemplary embodiment of an in-cell polarizer according to the invention.

The in-cell polarizer IP illustrated in FIG. 4 includes a first substrate 30, a wire grid polarizer 35 provided on a first surface 30a of the first substrate 30, and a reflecting unit 25 provided on a second surface 30b of the first substrate 30. In FIG. 4, an example is illustrated in which the reflecting unit 25 is provided on an upper surface of the first substrate 30 and the wire grid polarizer 35 is provided on a lower surface of the first substrate 30.

Figure 5:
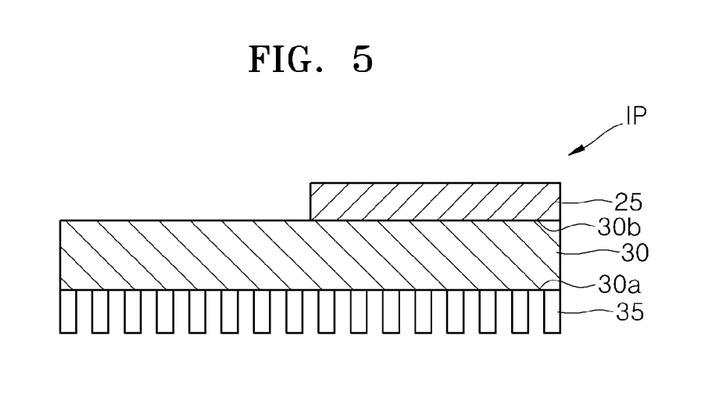

The in-cell polarizer IP illustrated in FIG. 5 includes a first substrate 30, a wire grid polarizer 35 provided on a first surface 30a of the first substrate 30, and a reflecting unit 25 provided on a second surface 30b of the first substrate 30. In FIG. 5, an example is illustrated in which the wire grid polarizer 35 is provided on the entire first surface 30a of the first substrate 30.

Figure 6:
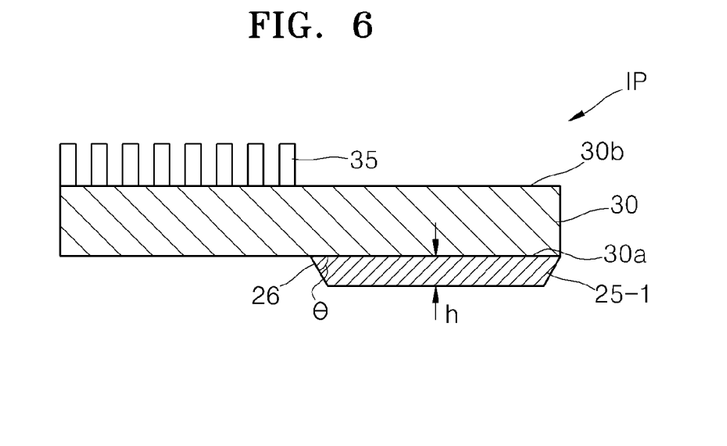
Figure 7:
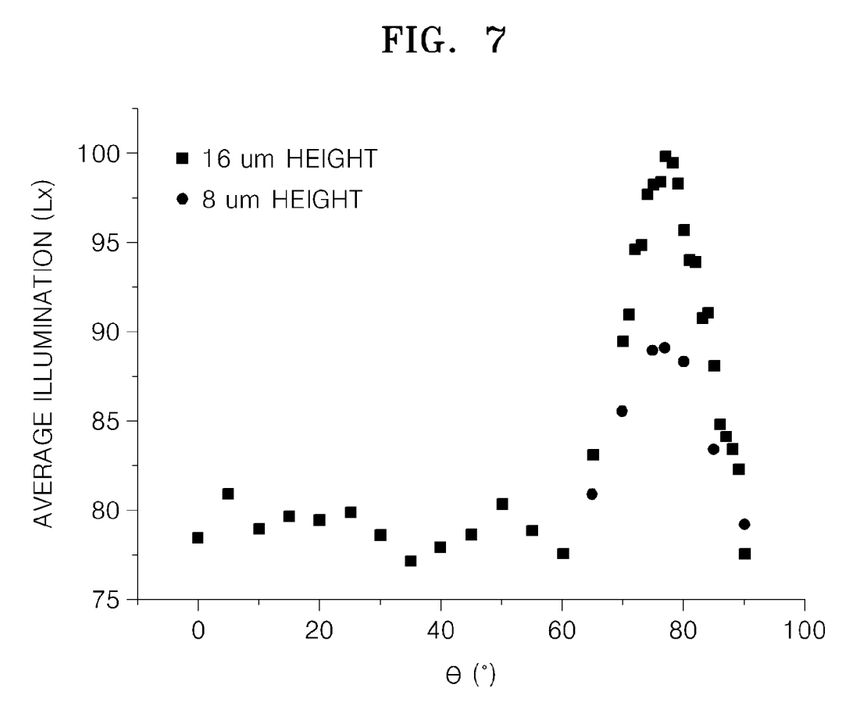
FIG. 7 illustrates a change in average illumination according to a slope of a side surface of a reflecting unit of the in-cell polarizer of FIG. 6.

The in-cell polarizer IP illustrated in FIG. 6 includes a first substrate 30, a reflecting unit 25-1 provided on a first surface 30a of the first substrate 30, and a wire grid polarizer 35 provided on a second surface 30b of the first substrate 30. The reflecting unit 25-1 may include at least one tilted side surface 26. In an exemplary embodiment, the reflecting unit 25-1 may have a trapezoidal cross-section, for example. FIG. 7 illustrates a change in average illumination measured in terms of lux (lx) according to a tilt angle θ in degrees (°)

of the side surface 26 of the reflecting unit 25-1 in FIG. 6. FIG. 7 illustrates simulation results when heights h of the reflecting unit 25-1 are 16 micrometers (μm) and 8 μm. The average illumination is relatively high when the tilt angle θ of the side surface 26 of the reflecting unit 25-1 is, for example, in the range of about 60 degrees to about 80 degrees.

When the reflecting unit 25-1 has a side surface tilted with respect to the first surface 30a, the average illumination may be higher than when the reflecting unit 25-1 has a side surface that has a right angle with the first surface 30a.

Figure 8:
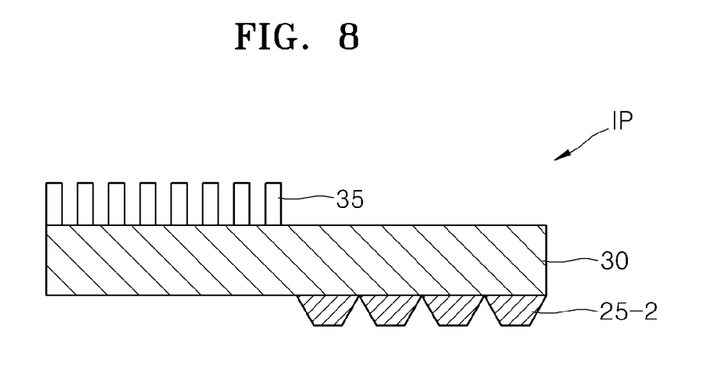
FIGS. 8 to 14 illustrate examples of an exemplary embodiment of an in-cell polarizer according to the invention.
Figure 9:
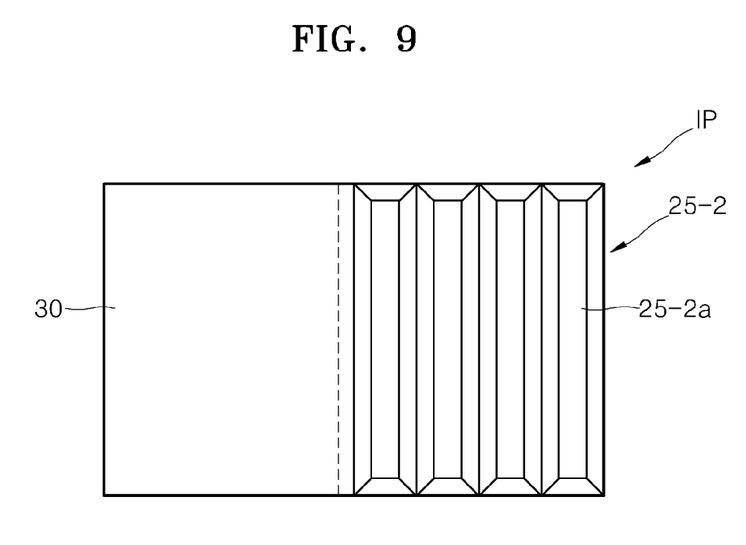

Next, the in-cell polarizer IP illustrated in FIG. 8 includes a first substrate 30, a reflecting unit 25-2 provided on a first surface 30a of the first substrate 30, and a wire grid polarizer 35 provided on a second surface 30b of the first substrate 30. The reflecting unit 25-2 may have an array structure. In an exemplary embodiment, in the reflecting unit 25-2, as illustrated in FIG. 9, a plurality of unit bodies 25-2a may be arranged in a one-dimensional array structure. The unit bodies 25-2a may have various shapes. In an exemplary embodiment, the unit bodies 25-2a may have polygonal cross-sections. The unit bodies 25-2a may have, for example, rectangular cross-sections, trapezoidal cross-sections, or triangular cross-sections.

Figure 10:
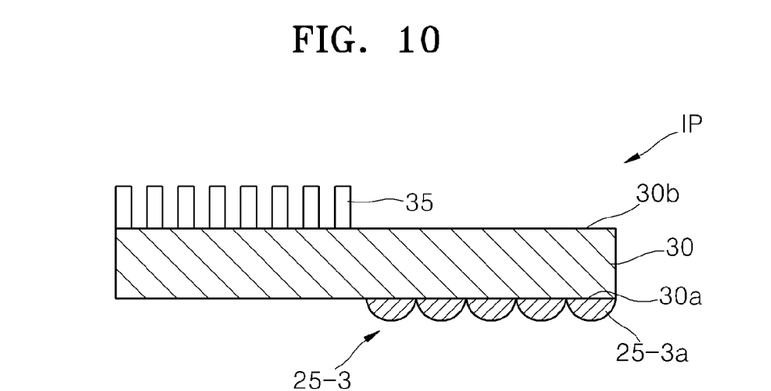

As illustrated in FIG. 10, a reflecting unit 25-3 may include unit bodies 25-3a having semicircular cross-sections. In an exemplary embodiment, the unit bodies 25-3a may be, for example, semi-cylindrical, for example. In an exemplary embodiment, the unit bodies 25-3a may be arranged in a one-dimensional array structure.

Figure 11:
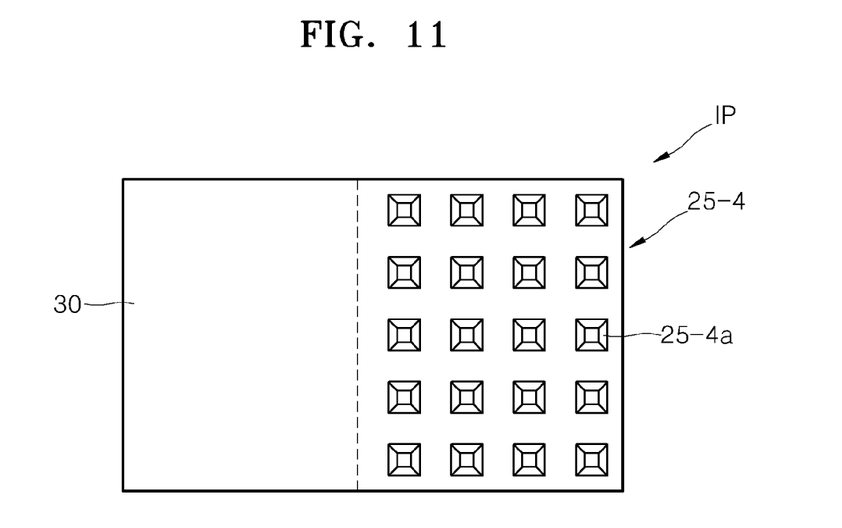

Next, in the in-cell polarizer IP illustrated in FIG. 11, a reflecting unit 25-4 may have a two-dimensional array structure. The reflecting unit 25-4 may have a plurality of unit bodies 25-4a and the plurality of unit bodies 25-4a may be arranged in the two-dimensional array structure. The unit bodies 25-4a may be arranged to be separate from each other or to contact each other. The unit bodies 25-4a may have various shapes. In an exemplary embodiment, the unit bodies 25-4a may have polygonal cross-sections, for example. In exemplary embodiments, the unit bodies 25-4a may have, for example, rectangular cross-sections or trapezoidal cross-sections.

Figure 12:
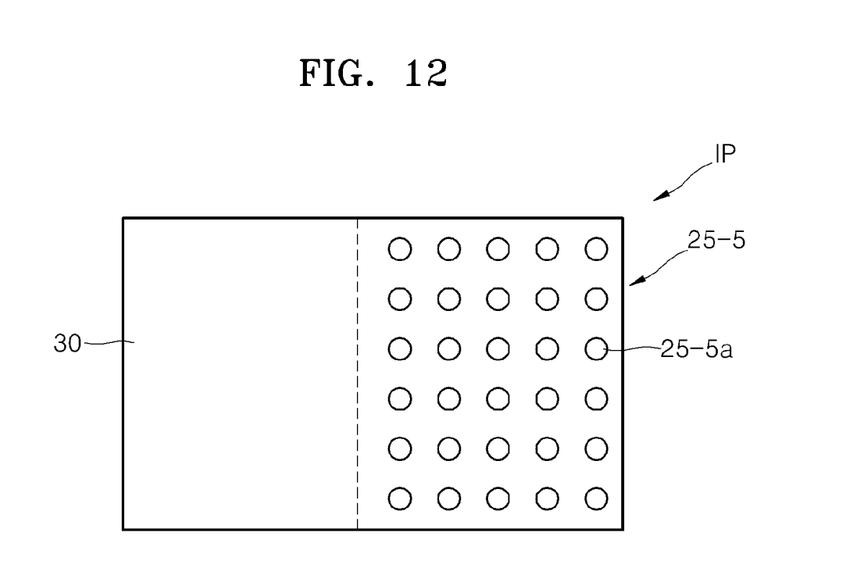

As illustrated in FIG. 12, a reflecting unit 25-5 may include spherical unit bodies 25-5a, for example. In an exemplary embodiment, the unit bodies 25-5a may be arranged in a two-dimensional array structure, for example.

Figure 13:
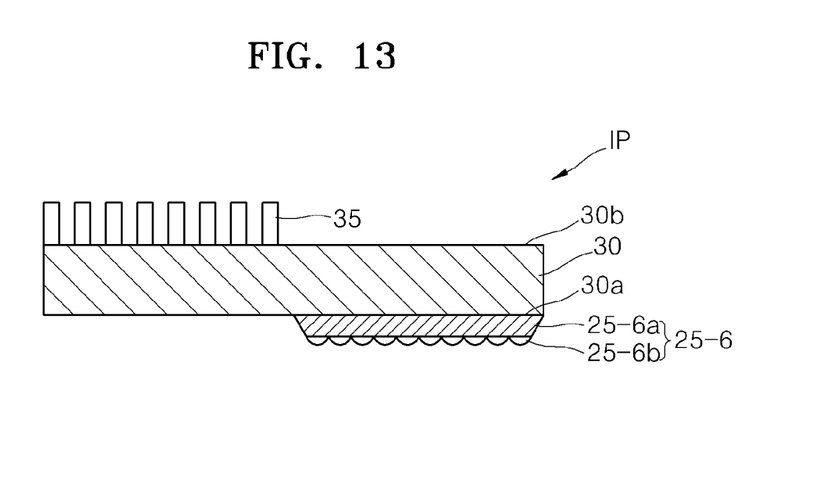

FIG. 13 illustrates another example of the in-cell polarizer IP. The in-cell polarizer IP includes a first substrate 30, a reflecting unit 25-6 provided on a first surface 30a of the first substrate 30, and a wire grid polarizer 35 provided on a second surface 30b of the first substrate 30. The reflecting unit 25-6 may include a body 25-6a and an uneven unit 25-6b provided on the body 25-6a. The body 25-6a may have a cross-section with various shapes. In an exemplary embodiment, the body 25-6a may have a polygonal cross-section, for example. The body 25-6a may have a trapezoidal cross-section. Reflection efficiency may be improved by the uneven unit 25-6b.

Figure 14:
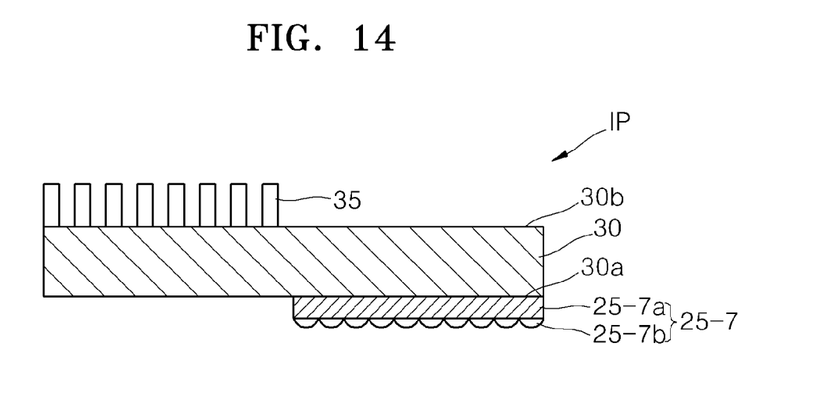

The in-cell polarizer IP illustrated in FIG. 14 includes a first substrate 30, a reflecting unit 25-7 provided on a first surface 30a of the first substrate 30, and a wire grid polarizer 35 provided on a second surface 30b of the first substrate 30. The reflecting unit 25-7 may include a body 25-7a and an uneven unit 25-7b provided on the body 25-7a. In an exemplary embodiment, the body 25-7a may have, for example, a rectangular cross-section, for example.

FIGS. 6 to 14 illustrate the examples of the in-cell polarizer, in which the reflecting unit is provided on the first surface of the first substrate. However, the reflecting unit may be provided on the second surface of the first substrate.

Next, a method of manufacturing an LCD according to an exemplary embodiment of the invention will be described. In the method of manufacturing the LCD, referring to FIG. 1, the light source unit 20 is disposed and the in-cell polarizer IP is disposed on the light source unit 20. When the in-cell polarizer IP is manufactured, a process for an upper portion of the first substrate 30 and a process for a lower portion of the first substrate 30 may be separately performed. In an exemplary embodiment, the reflecting unit 25 may be disposed on one surface, for example, the first surface 30a of the first substrate 30, and the wire grid polarizer 35 may be disposed on another surface, for example, the second surface 30b of the first substrate 30.

Figure 15:
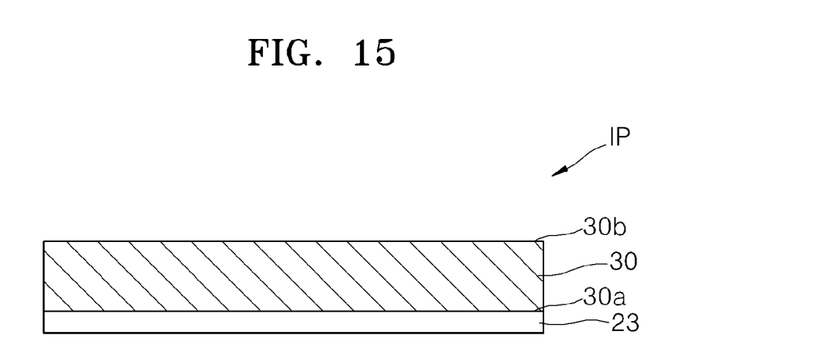
FIGS. 15 to 17 illustrate an exemplary embodiment of a method of manufacturing an LCD according to the invention.
Figure 16:
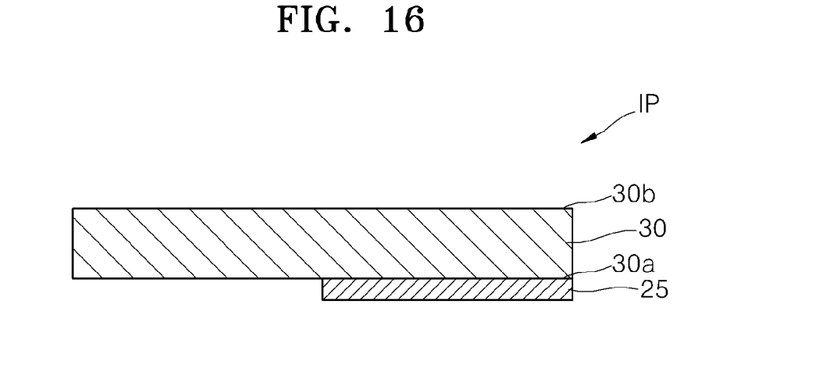

Processes of manufacturing the reflecting unit 25 will be described with reference to FIGS. 15 and 16. In an exemplary embodiment, the reflecting unit 25 may be provided by a photolithography method, for example. In an exemplary embodiment, a metal layer 23 is deposited on the first surface 30a of the first substrate 30 and a photolithography process using a mask is performed to provide a pattern for the reflecting unit 25. The metal layer 23 is etched in accordance with the pattern to expose a part of the first surface 30a of the first substrate 30 and to provide the reflecting unit 25 in a remaining region. The pattern may vary in accordance with the pattern of the black matrix provided on the electrode layer 40. The metal layer in a region corresponding to the opening area OA (refer to FIG. 1), in which the black matrix is not provided, is etched and the metal layer in a region corresponding to the non-opening area NOA (refer to FIG. 1), in which the black matrix is provided, is left to form the reflecting unit 25. In an exemplary embodiment, the metal layer 23 may include at least one of Al, Ag, Au, and Pt, for example. In exemplary embodiments, wet etching or dry etching may be used as an etching method, for example. Here, an etching condition such as etching time or etching solution is controlled to control a shape and size of the reflecting unit 25.

Figure 17:
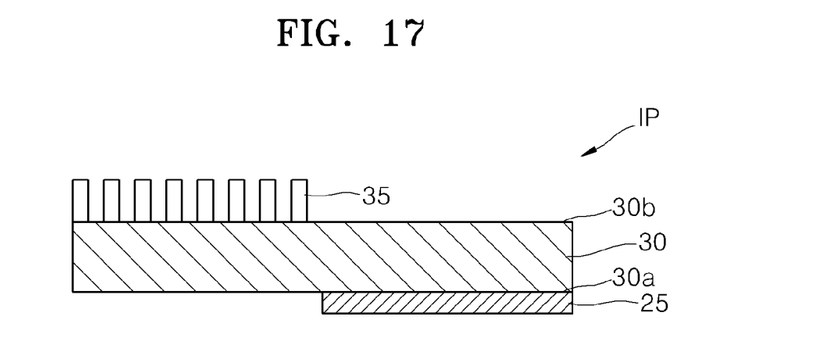

Next, as illustrated in FIG. 17, the wire grid polarizer 35 is disposed on the second surface 30b of the first substrate 30. The wire grid polarizer 35 may be provided by one of a nanoimprint method, a block-copolymer lithography method, an e-beam lithography method, and a glancing angle deposition method.

Since the reflecting unit 25 and the wire grid polarizer 35 are disposed on different surfaces of the first substrate by independent processes, after the reflecting unit 25 is provided, when the wire grid polarizer 35 is manufactured, an additional process for protecting the reflecting unit 25 is not required. Therefore, the manufacturing processes of the in-cell polarizer may be simplified and manufacturing cost thereof may be reduced.

Next, referring to FIG. 1, the electrode layer 40 is disposed above the first substrate 30, and the second substrate 50 is provided to be separated from the electrode layer 40. The electrode layer 40 is disposed and the black matrix 45 may be disposed thereon. The polarizing plate 55 is disposed on one surface of the second substrate 50. The LC layer 48 may be provided between the electrode layer 40 and the second substrate 50.

It should be understood that the exemplary embodiments described therein should be considered in a descriptive sense only and not for purposes of limitation. Descriptions of features or exemplary embodiments within each embodiment should typically be considered as available for other similar features or exemplary embodiments in other embodiments.

While one or more embodiments of the invention have been described with reference to the figures, it will be understood by those of ordinary skill in the art that various changes in form and details may be made therein without departing from the spirit and scope of exemplary embodiments of the invention as defined by the following claims.

What is claimed is:

1. A liquid crystal display comprising:
a light source unit;
a first substrate provided on the light source unit;
an electrode layer provided on the first substrate;
a second substrate separate from the electrode layer;
a polarizing plate provided on a surface of the second substrate;
a liquid crystal layer disposed between the electrode layer and the second substrate;
a reflecting unit provided on a surface of the first substrate to reflect light from the light source unit; and
a wire grid polarizer provided on an opposite surface of the first substrate,
wherein the reflecting unit and the wire grid polarizer are provided on different surfaces of the first substrate respectively, and
a region in which the reflecting unit is provided and a region in which the wire grid polarizer is provided are separated from each other in a plan view.

2. The liquid crystal display of claim 1,
wherein the first substrate comprises:
a first surface facing the light source unit; and
a second surface facing the electrode layer,
wherein the reflecting unit is provided on the first surface of the first substrate, and
wherein the wire grid polarizer is provided on the second surface of the first substrate.

3. The liquid crystal display of claim 1,
wherein the electrode layer comprises a black matrix, and
wherein the reflecting unit is arranged in a position corresponding to the black matrix.

4. The liquid crystal display of claim 3, wherein the wire grid polarizer is arranged in a position corresponding to an opening area in which the electrode layer is exposed by the black matrix.

5. The liquid crystal display of claim 1, wherein the reflecting unit has at least one tilted side surface in a cross section.

6. The liquid crystal display of claim 1, wherein the reflecting unit comprises a plurality of unit bodies.

7. The liquid crystal display of claim 6,
wherein each of the plurality of unit bodies has at least one tilted side surface in a cross section, and
wherein the plurality of unit bodies is arranged in a one-dimensional array structure or a two-dimensional array structure.

8. The liquid crystal display of claim 7, wherein each of the plurality of unit bodies has at least one of a trapezoidal cross-section, a semicircular cross-section, and a triangular cross-section.

9. The liquid crystal display of claim 1, wherein the reflecting unit comprises:
a body; and
an uneven unit provided on the body.

10. The liquid crystal display of claim 9, wherein the body has a rectangular cross-section or a trapezoidal cross-section.

11. An in-cell polarizer comprising:
a substrate;
a reflecting unit provided on a surface of the substrate to reflect light from a light source unit; and
a wire grid polarizer provided on an opposite surface of the substrate,
wherein the reflecting unit and the wire grid polarizer are provided on different surfaces of the first substrate respectively, and
a region in which the reflecting unit is provided and a region in which the wire grid polarizer is provided are separated from each other in a plan view.

12. The in-cell polarizer of claim 11, wherein the reflecting unit is provided in a partial region of the substrate.

13. The in-cell polarizer of claim 11, wherein the reflecting unit has at least one tilted side surface in a cross section.

14. The in-cell polarizer of claim 11, wherein the reflecting unit comprises a plurality of unit bodies.

15. The in-cell polarizer of claim 14,
wherein each of the plurality of unit bodies has at least one tilted side surface in a cross section, and
wherein the plurality of unit bodies is arranged in a one-dimensional array structure or a two-dimensional array structure.

16. The in-cell polarizer of claim 15, wherein each of the plurality of unit bodies has at least one of a trapezoidal cross-section, a semicircular cross-section, and a triangular cross-section.

17. The in-cell polarizer of claim 11, wherein the reflecting unit comprises:
a body; and
an uneven unit provided on the body.

* * * * *